May 31, 1949.   H. D. VAN SCIVER, II   2,472,044
ELECTRIC CONTROL APPARATUS FOR VARIABLE LOADS
Filed June 14, 1946                         2 Sheets-Sheet 2

INVENTOR
HERBERT D. VAN SCIVER II

BY *Donald B. White*
ATTORNEY

Patented May 31, 1949

2,472,044

UNITED STATES PATENT OFFICE 2,472,044

ELECTRIC CONTROL APPARATUS FOR VARIABLE LOADS

Herbert Doane Van Sciver, II, Merion, Pa., assignor to The Budd Company, Philadelphia, Pa., a corporation of Pennsylvania Application June 14, 1946, Serial No. 676,653

10 Claims. (Cl. 219—4)

This invention relates to electric control apparatus for variable loads such as welding loads, to which the invention has specific adaptation.

Certain loads in the manufacturing fields involving heat cycles are subject to variation in physical characteristics during or at the completion of a heating operation. This change in characteristics may be utilized as a basis for controlling the power circuit or signaling the termination of the heating operation. In the case of welding, for example, such as resistance welding, the weld is completed when a fused nugget forms at the interface between the workpieces.

In my copending application Serial No. 524,243, filed February 28, 1944, now Patent No. 2,433,967, for "Method of weld control," I have indicated a method of weld control which is directly dependent upon the change of resistance occurring at the weld point as a result of the fusion brought about by the heating current. The method as described in said application has been found to be generally effective and efficient for termination of the weld at the completion thereof instead of, as in prior methods, disrupting the current flow at the end of a predetermined average time period, which may be either sufficient or insufficient for the desired purpose. In the operation of my method as above referred to, it is desirable that the potential of the source current be maintained approximately constant as well as the current in the control circuit so that the mechanism for opening the welding circuit will act uniformly under conditions which are equivalent.

As a result of my investigation into this general problem of welding, I have found that under special conditions of operation the maintenance of the voltage at a substantially constant value may result in a heat balance between the input of heating current at the weld point and the dissemination of heat from this point by radiation and conduction, so that the provision of heating energy at the weld is inadequate.

A primary object of the present invention is to provide apparatus for increasing the input of heat energy at the weld point with time progressively so that a heat balance is avoided.

Another object is to secure more uniform weld strength irrespective of variation in time.

Another object of the invention is to provide apparatus which may be readily adapted to weld control by percentage change of resistance at the weld point for preventing the heat balance at this point prior to weld fusion.

Still another object is to provide a system of weld control which will permit elimination of voltage compensating apparatus in the circuit.

An object also of the invention is to provide apparatus which will permit at will progressive increments of heat application to a load, or progressive decrements.

An additional object is to provide a type of weld control which will permit either increase or decrease of current input and consequently heating effect at a load point in a single consecutive heating operation.

Another object is to overcome losses due to power contacts at the weld point.

Other objects of the invention associated with the particular specific form of invention as disclosed will appear on consideration of the following description and examination of the drawings, in which.

Figure 1:
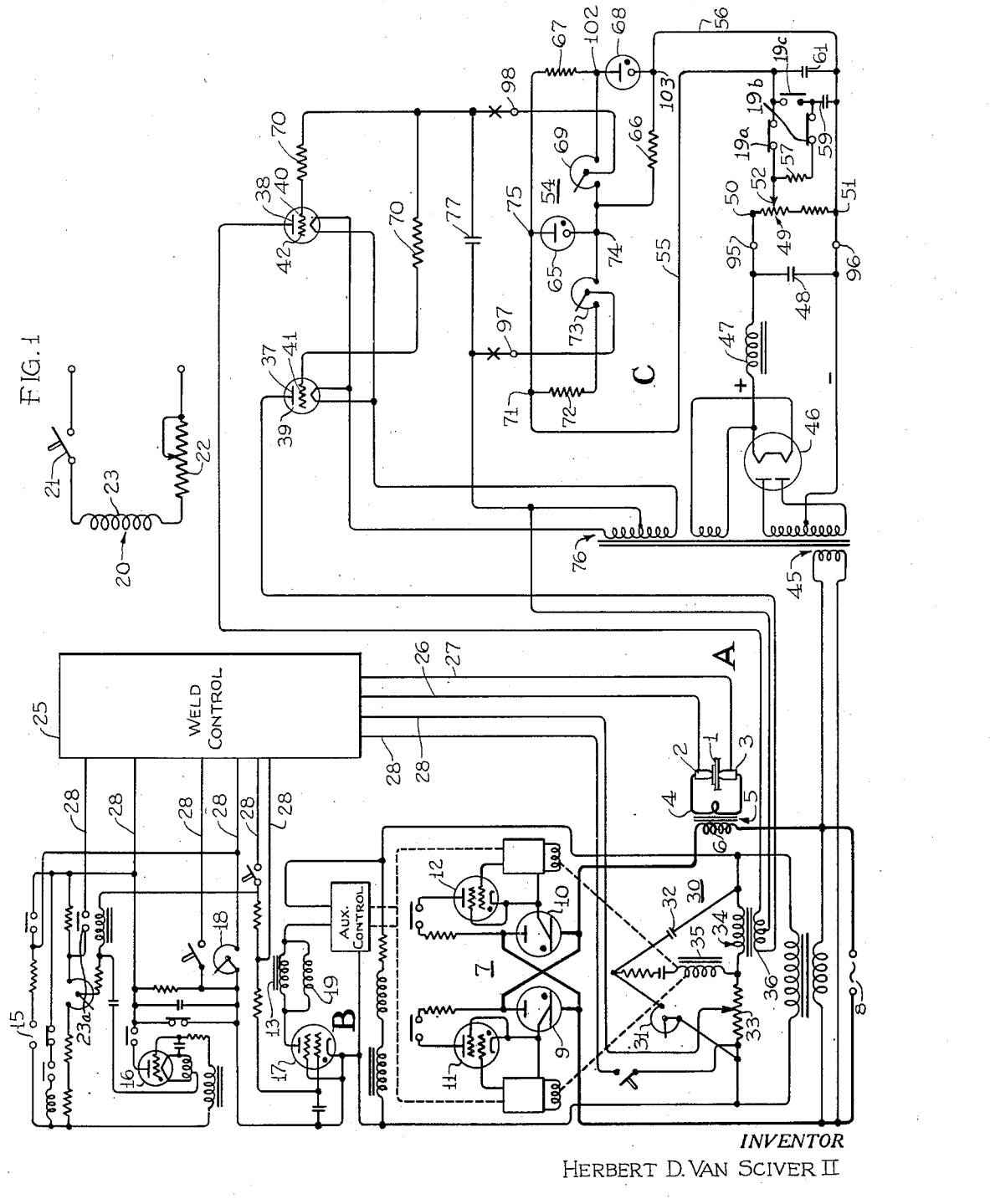
Figure 1 is a wiring diagram of the circuit employed in the apparatus.

The invention is applicable to the control of a load subject to change of electrical resistance through heat application. This resistance change may be a primary effect, as in a welding operation, or it may be secondary in parallel with physical changes in other loads, which changes are made effective at a variable resistance subject to heat action or other voltage changing means. In view of the special adaptability of the method, however, to resistance welding, the showing is directed for purpose of illustration to this type of welding. Accordingly, Figure 1 is a wiring diagram illustrative of the application of the method to conventional resistance welding of the spot type.

The diagram may be divided into sections indicative of the function, including sections A, B and C. Section A relates to the power application, section B to the power control section, and section C to the heat input control. Considering the A section, there is disclosed a workpiece 1 consisting of two plates which are to be welded together by passage of current from the engaging electrodes 2 and 3. These electrodes are supplied with heating current from the secondary 4 of the welding transformer 5. The primary 6 of this transformer is in series with the contactor unit 7 and a source of alternating current power 8. The contactor 7 is of conventional arrangement, including the power transmitting ignitrons 9 and 10 with the associated control thyratrons 11 and 12 and other apparatus, including relays and switches.

The contactor unit 7 is subject to control from additional branch circuits of the power control system operated from a source of direct current 15 which supplies current to a trigger tube 16 and a timing control tube 17 to determine the number of cycles in which the current is applied for heating the weld. The actual length of time period is dependent upon the setting of the variable slide resistor 18, and it is understood that this timing function is retained in the circuit as illustrative of a protective means for overall limitation of heat application. For example, the limit of heat application may be set at 30 cycles of current, assuming that the normal weld control will function on the average in the neighborhood of 20 cycles, but if for any reason this should not occur, the conventional timing mechanism of the circuit set for 30 cycles will insure opening of the power within a reasonable time period. The relay coil 19, in shunt with power control transformer 13, initiates action of the heat control, as will be hereinafter described.

Initiation of the power weld current supply is controlled by an initiating circuit, generally indicated by the numeral 20, which includes a manual operating switch 21, a variable resistor 22, and a relay coil 23 operative to close the related initiating switch 23a in the control circuit. Means for disrupting the control circuit and accordingly the power circuit is provided in a weld control unit, generally indicated by the numeral 25, which has direct connection to the electrodes 2 and 3 by conductors 26 and 27, as well as to current breaking units in the power control circuit by means of conductors 28. This method of weld control is preferably that disclosed in my copending application above referred to and in the copending application of Edwin M. Callender, Serial No. 630,401, assigned to the same assignee as the current application. In this method of weld control voltage change at the weld point occurring on weld completion energizes the equipment bringing about opening of the power circuit.

A second control applicable to the contactor pertains to the point in the cycle at which the power is made effective. This unit is indicated generally by the numeral 30 and comprises a phase shift unit with peaking coils operable to actuate the contactor in accordance with the position of the phase. This phase shift unit includes a bridge having a slide resistor 31 and a capacitor 32 in two adjoining arms and a variable resistor 33 and variable impedance 34 in the other two arms, with a peaking transformer 35 connected in the bridge. This transformer is electrically connected to the weld control thyratron circuits, as indicated by dash lines, so that the functioning of the thyratrons is dependent upon the operation of the transformer 35. Control of phase is by means of transformer 34 acting as a variable impedance. It appears on inspection that the secondary 36 of this transformer has its terminals connected directly to the anodes 37 and 38, respectively, of vacuum tubes 39 and 40, and hence the control of current through these tubes will determine the impedance of the transformer 34. In accordance with the usual control method for electronic tubes, the grids 41 and 42 of these two tubes have connection to a voltage source which governs the degree of bias applied to the grids and thereby permits variation in the effective resistance of the tubes. This control is a part of the section C of the circuit, as will now be described.

As shown by the drawing, there is directly connected across the source 8 of alternating current a transformer 45. One secondary of this transformer is employed in a rectifying circuit including the rectifier 46, choke coil 47, and capacitor 48. The output of this rectified circuit is led through a potentiometer 49 having fixed points 50 and 51 at the terminals thereof and a slide contact 52 for potential variation. The slide contact has connection to a normally closed relay switch 19a and to a bridge unit 54 to which the terminal 51 also has connection, conductors 55 and 56 leading from these connecting points, respectively, to bridge points 75 and 103. By means of the slide 52 the bridge 54 is properly balanced with the source voltage. In addition to the normally closed relay contact 19a in conductor 55 there is included in this section of the circuit a branch circuit leading from point 52 to the conductor 56 through a fixed resistor 57, normally closed relay switch 19b, and capacitor 59. Normally open relay switch 19c connects conductor 55 to the capacitor 59 forming a parallel path with the relay switch 19b. A capacitor 61 also is placed in parallel with points 52 and 51 of the potentiometer, this capacitor having a low capacitance as compared with the capacitor 59.

The bridge 54 is intended to provide a voltage differential on the grids 41 and 42 of the impedance tubes 39 and 40. For this purpose the bridge is formed of two parallel sections including, on the one hand, a voltage regulator tube 65 and a resistor 66, and, on the other hand, a resistor 67 and a voltage regulator tube 68 connected for each parallel section in the sequence mentioned between common points 75 and 103. The junction of the resistor and tube on each branch is joined by a potentiometer 69 affording it a potential tap extending through fixed resistors 70 to the grids 41, 42 of tubes 39 and 40.

The conductor 55 passes through a point 71 from which connection is made, on the one hand, through a fixed resistor 72 and a potentiometer 73 to the negative side 74 of tube 65, and, on the other hand, directly to the positive side 75 of tube 65. Potentiometer 73 with resistor 72 form a voltage divider circuit providing a fixed bias on tubes 39 and 40. This arises from the fact that these resistors are connected directly across constant potential tube 65. By means of the potentiometer the fixed bias on the tubes may be varied. Potentiometer 69 is provided so as to transmit the desired fraction of voltage change at the bridge between points 74 and 102 due to change of bridge voltage. A decrease in bridge voltage produces a decrease in bias on the grids of tubes 39 and 40, thus resulting in a reduction of impedance in the phase shift transformer secondary and an increase in load current. The capacitor 77 of low capacitance is connected between the taps of potentiometers 73 and 69 to by-pass circuit transients.

The operation of the apparatus will now be described. Assuming the workpiece in position between the electrodes 2 and 3 and the power connections established at terminals 8 and 15, the initiating switch 21 is closed. Energization of relay 23 closes switch 23a in the power control circuit, initiating action of the trigger tube 16 and timing tube 17 in accordance with established sequence of operation. Activation of the timing circuit causes the contactor controls to function and current is supplied the welding transformer and electrodes for welding operation. It is assumed that the controls of the phase shift 30 including the resistors 31 and 33 are so adjusted as to provide initially a reduced amount of current at the weld, the effective period of the cycle employed for current transmission being substantially reduced.

Prior to activation of the timing circuit including tube 17, capacitor 59 in the C-section is charged by rectified current from transformer 46 and, on energization of relay 19 in the timing circuit of the B-section, switches 19a and 19b in the C section of the circuit are opened and switch 19c closed. During this charging operation capacitor 61, which has also been previously charged, sustains a voltage on the bridge 54 to maintain current flow in voltage tubes 65 and 66, but, on completion of the change-over, capacitor 59 functions. The action of this branch of the circuit consists in the discharge of capacitor 59 from a peak value in accordance with the usual characteristic of a condenser. Consequently, there is impressed upon the bridge 54 between points 75 and 103 a progressively decreasing rectified voltage which produces a decreasing voltage at points 74 and 102 and consequently a decreasing bias on the grids 41 and 42 of impedance tubes 39 and 40. As a result the impedance of the transformer 34 is reduced to shift the phase of the current and thereby bring about an automatic increase in the percentage of half-cycle current supply in which the contactor is effective. In this manner the total heat input is increased progressively as the capacitor 59 discharges until the weld material fuses.

It is pointed out that there is no heat balance following the method of this circuit inasmuch as the action of the circuit is to increase the current with each half cycle of time, and the method therefore is independent of the capacity of the materials at the weld for withdrawing heat from the weld point. Obviously, therefore, the method has adaptibility for sheets of varying thickness, being equally effective with thick sheets as with thinner stock. It is apparent also that utilizing this particular method of heat increment at the weld point the necessity for voltage compensation no longer exists. With this method the emphasis is upon increasing heat input rather than upon uniformity of voltage.

An advantage of the described method is the reduction in losses due to poor contacts at the weld point. With ordinary constant and relatively high initial voltages with increased current values, poor surface contacts between sections of the workpiece and between the workpiece and electrodes result in arcing and consequent pitting and general deterioration of the electrode structure. With applicant's method the initial voltages and currents are reduced below the average values for the welding or load period and hence there is time for breakdown of the contact resistances before the higher voltages and currents become effective.

Attention is directed also to the economy in time resulting from the method of applicant. In ordinary methods a drop of 10%, for example, in the applied voltage would require an increase of around 40 to 50% in time for heat compensation, while with applicant's method the increasing heat input cuts this excess time down to around 10 to 20% increase.

Note is made of the fact that although the time discharge of the capacitor 59 is exponential in form, the control time interval is limited so that the chosen section of the curve may be approximately straight. Further, it may be desired to obtain linearity in the current squared instead of the current to the first power, and this also may be readily approximated by selecting the proper section of the time discharge curve and auxiliary controls if desired.

Combined with this particular method of heat control preferably may be employed the weld control method as described in the copending applications above referred to. By this particular weld control method the drop in voltage at the weld point to a certain predetermined percentage brings about activation of the disrupting apparatus of the welding circuit. Since the weld control of these copending applications is effective on a percentage basis, the absolute value of current at the weld is immaterial, the control functioning to open the power circuit whenever the percentage value as previously determined upon is reached. Thus there is a desirable combination between the heat control of this invention and the weld control of the related applications above referred to.

Figure 2:
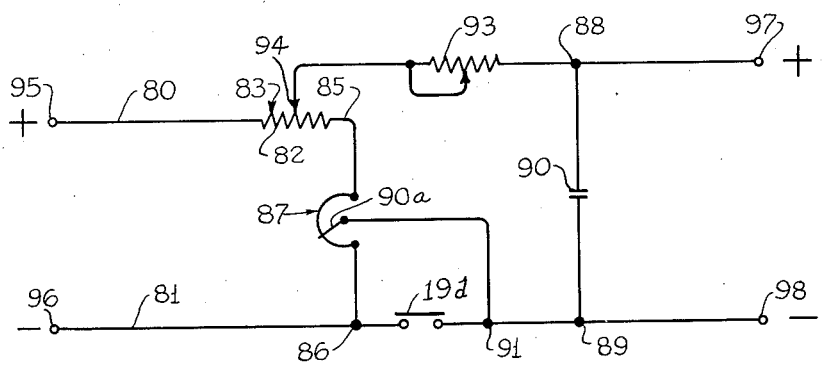
Figure 2 is a branch circuit insertable in the main circuit of Figure 1 for securing a diminution of heat input at the weld point.

The circuit as described and shown in Figure 1 is usable for an increasing gradation of current to the weld point. Should it be desirable to obtain a diminishing gradation with time of current flow or an increasing gradation, or both increase and decrease at different times, the circuit may be modified as indicated in Figure 2 of the drawings. In this figure there is shown a branch circuit which consists of two main conductors 80 and 81, conductor 80 including the resistor 82 of potentiometer 83 and conductor 81 including a normally open relay switch 19d. Joining these two circuits at points 85 and 86 is a potentiometer 87, and joining points 88 and 89 there is the main capacitor 90. The contact slide 90a of potentiometer 87 has connection with point 91 on main conductor 81 between the switch 19d and point 89. Also, a variable resistor 93 is connected between the conductor point 88 and the slide 94 of potentiometer 83. The terminals of this modified circuit at one end are indicated by the numerals 95 and 96 and at the other end by the numerals 97 and 98. These numerals correspond to similar numerals 95, 96, 97 and 98 in the C section of the circuit of Figure 1, and it is to be understood that this branch circuit is to be inserted at these corresponding points to secure the diminishing gradation of current as above referred to.

The action of this modified circuit is briefly as follows: With relay switch 19d normally open and potentiometer 83 set for the desired voltage on the capacitor 90, the capacitor 90 is initially charged to the reduced voltage between points 94 and slide 90a. On weld action of the current through energization of relay 19, relay switch 19d is closed and the capacitor is subjected to the increased voltage between points 94 and 86. This increases the bias on the grids of tubes 39 and 40 and consequently brings about the reverse action of the arrangement of Figure 1, increasing the impedance in the phase shift transformer. Thus there results an automatic decrease in the percentage of half-cycle current supply at the load.

The modification of Figure 2 may be retained in the circuit for current change at the weld point with increasing values by making the relay switch 19d normally closed and opened with actuation of the timing circuit of the power control. Obviously by the use of time delay mechanism or by using separate timers, as indicated in Figure 3, a combination of curves for either increase or decrease of current with time may be obtained.

Referring to a specific cycle, and assuming that switch 19d is normally closed to charge capacitor 90 prior to the start of the flow of welding current but that it is opened at the start of the welding action, the capacitor will begin to discharge down from its highest to its lower value and will cause an increase in heating current up to the change point at which the weld is made; then after a time delay, if delay is desired, switch 19d is again closed to cause the charge on the capacitor to rise towards its highest value and correspondingly cause the heating current to decrease until it is finally cut off entirely at the end of the welding cycle.

Figure 3:
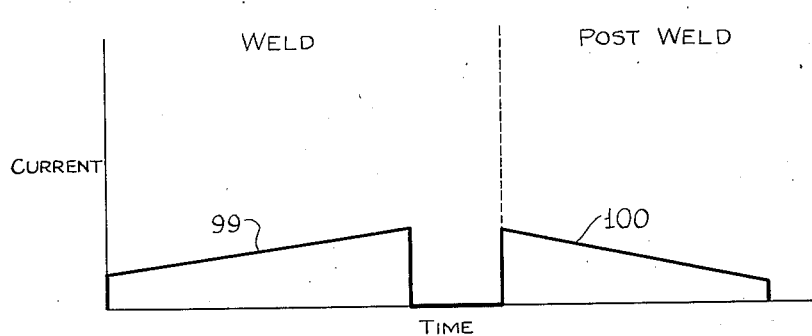
Figure 3 is a view showing the current application during consecutive time periods of welding and post welding in which the apparatus of the invention may be utilized to increase and decrease the heat input successively.

Referring to Figure 3 which shows the action by diagram, a welding time period is shown in which there is a regular weld period and a post weld period indicating the normal completion of the weld in the first weld period and a subsequent period for treatment in the post weld section, such as is accomplished by annealing. Two separate timers are used, each of which may function to produce a desired gradient of current change at the weld point. As indicated in the Figure, during the weld the current 99 progressively increases for most of the pre-weld period. In the post-weld period the current 100 progressively decreases.

Figure 4:
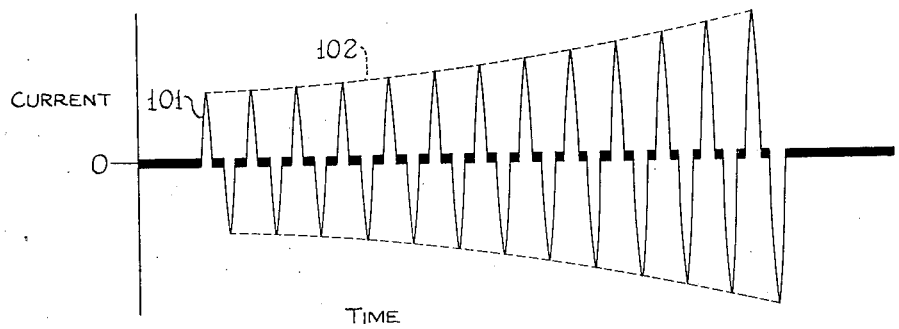
Figure 4 is a view of the oscillographic record of current flow in the circuit as developed at the weld point.

As illustrative of the action of the apparatus in securing a current change at the weld, reference is made to Figure 4 which is a copy of an oscillogram indicating current change with time and showing in the various successive current waves 101 an increasing amplitude, as brought out by the envelope 102 shown in dotted outline, and increasing phase shift as denoted by the progressively greater width of each successive half cycle.

The apparatus as hereinabove described has been found effective in actual use and hence may be preferred. However, it is apparent that modifications of the same may be made and hence no limitation is implied by the description other than that may be imposed thereon by the claims hereto appended.

What is claimed is:

1. A control system comprising a load circuit, a source of alternating current for supplying current to said load circuit, heat control means including a phase shift bridge having a variable impedance in one arm thereof for changing the current supply to said load circuit, and phase shift means for changing the impedance and phase of said bridge continuously during supply of current to said load circuit whereby the current supply to the load is progressively changed.

2. A control system comprising a load circuit, a source of alternating current for supplying current to said load circuit, heat control means including a phase shift bridge having a variable impedance in one arm thereof for changing the current supply to said load circuit, and phase shift means for changing the impedance and phase of said bridge continuously during supply of current to said load circuit whereby the current supply to the load is progressively changed, said phase shift means comprising a capacitor, a rectifier for charging said capacitor a thermionic tube connected to said impedance and having a control grid for changing the effective resistance thereof, and switch means for connecting said capacitor with the control grid of said tube, whereby the effective value of the bridge impedance and the heat supply at the load may be progressively varied.

3. An electric control system comprising a load circuit subject to a predetermined voltage change subsequent to current closure and before current cut-out, a source of alternating current for supplying current to said load circuit, heat control means including a phase shift bridge having a variable impedance in one arm thereof for changing the current supply to said load circuit, and shift means for varying the value of said impedance continuously with time during the period of current flow in said load circuit to increase progressively the current flow in said load circuit from initiation of power to said voltage change in the load circuit.

4. A control system comprising a load circuit subject to a predetermined voltage change subsequent to circuit closure and before circuit cut-out, a source of alternating current for supplying current to said load circuit, heat control means including a phase shift bridge having a variable impedance in one arm thereof, and shift means for varying the value of said impedance continuously with time to increase progressively the current flow in the load circuit from initiation of load current to cut-out thereof, said shift means comprising a capacitor, a voltage regulator connected to said capacitor, means for establishing a progressively changing voltage differential in respect to said regulator, and means for applying said voltage differential to the phase shift impedance for varying the value thereof.

5. A control system comprising a welding load circuit, a source of alternating current for supplying current to said load circuit, heat control means including a phase shift bridge having a variable impedance in one arm thereof for changing the current supply to said welding load circuit, and shift means for varying the value of said impedance continuously and consistently in one direction with time to increase the current flow at the load progressively from the initiation of welding current supply to the weld point and thereafter successively to decrease current flow progressively to a desired point.

6. A weld control system comprising weld electrodes adapted to receive a workpiece for welding, a source of alternating current for supplying current to said electrodes, heat control means including a phase shift bridge having a variable impedance therein for changing the current supply to said load, phase change means for changing continuously the impedance and phase of said bridge during the time of current supply to the load whereby the current supply to the load is progressively changed, and control means connected to said welding electrodes for disconnecting said source from the electrodes after a predetermined abrupt change in the voltage at the weld point due to weld fusion, said phase change means continuously and consistently changing the current from initiation of the welding current supply up to the time of disconnection at the fusion point.

7. In a weld control system, a load circuit including electrodes adapted to receive a workpiece, a power source adapted to supply alternating current to said load circuit, a contactor interposed between said source and load circuit, timing control means for effecting determination of the number of cycles of current effective in said load circuit at the electrodes, heat control means for determination of the fraction of each half cycle of alternating current effective at the weld point, means for initiating flow of power from said source to the load circuit, and single means for producing increasing heating of the weld point of the workpiece to a state of fusion, said single means comprising apparatus for increasing continuously and progressively the fraction of the half cycle of alternating current as determined by said heat control means from the time of power application to the time of fusion.

8. In a weld control system, a load circuit including electrodes adapted to receive a workpiece, a power source adapted to supply alternating current to said load circuit, a contactor interposed between said source and load circuit, timing control means for effecting determination of the number of cycles of current effective in said load circuit at the electrodes, heat control means for determination of the fraction of each half cycle of alternating current effective at the weld point, means for initiating flow of power from said source to the load circuit, and single means for producing increasing heating of the weld point of the workpiece to a state of fusion, said single means comprising apparatus increasing continuously and progressively the fraction of the half cycle of alternating current as determined by said heat control means from the time of power application to the time of fusion including a phase change bridge having a variable impedance in one bridge arm, and said half cycle fraction varying means including a device for varying the impedance of the phase change bridge.

9. An electric control system for a welding load circuit subject to an abrupt voltage change at the weld fusion point, comprising welding load connections, a source of alternating current, switch means for establishing a circuit between said source and load connections during fractions of successive half cycles of said source current, means for altering the action of said switch means at the voltage change point, and control means operable on said switch means for securing a continuous change in the value of current fraction supplied to the load during the time period between initiation of power and voltage change of said load.

10. An electric control system for a welding load circuit subject to an abrupt voltage change at the weld fusion point, comprising welding load connections, a source of power, switch means for establishing a circuit between said source and load connections for delivery of current to said load at normal full load value, means for altering the action of said switch means at the voltage change point, and control means for securing a continuous change in the rate of power supply to the load from the time of power application to the time of voltage change.

HERBERT DOANE VAN SCIVER, II.

REFERENCES CITED

The following references are of record in the file of this patent:

UNITED STATES PATENTS

| Number | Name | Date |
|---|---|---|
| 1,959,690 | Roth | May 22, 1934 |
| 2,243,833 | Bohn | June 3, 1941 |
| 2,306,593 | Callow | Dec. 29, 1942 |
| 2,314,691 | Dawson et al. | Mar. 23, 1943 |
| 2,363,719 | Cooper et al. | Nov. 28, 1944 |
| 2,429,186 | Johnson et al. | Oct. 14, 1947 |